United States Patent
Rambo

(10) Patent No.: US 8,073,391 B2
(45) Date of Patent: *Dec. 6, 2011

(54) WIFI INTERFACE TO DIALUP MODEM

(75) Inventor: Darwin Rambo, Surrey (CA)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/835,733

(22) Filed: Jul. 13, 2010

(65) Prior Publication Data

US 2010/0278224 A1 Nov. 4, 2010

Related U.S. Application Data

(63) Continuation of application No. 11/144,536, filed on Jun. 3, 2005, now Pat. No. 7,756,475.

(51) Int. Cl.
*H04B 7/00* (2006.01)
(52) U.S. Cl. ............. 455/41.2; 455/426.1; 455/445; 379/56; 379/57
(58) Field of Classification Search ............ 455/41.2, 455/426.1, 461, 445, 417; 379/56, 57, 58, 379/63, 210, 214
See application file for complete search history.

(56) References Cited

U.S. PATENT DOCUMENTS

| | | | |
|---|---|---|---|
| 4,744,103 A * | 5/1988 | Dahlquist et al. | 379/247 |
| 5,742,905 A | 4/1998 | Pepe et al. | |
| 5,887,058 A * | 3/1999 | Kammath et al. | 379/284 |
| 6,430,277 B1 * | 8/2002 | Roadifer et al. | 379/127.02 |
| 6,516,311 B1 * | 2/2003 | Yacoby et al. | 1/1 |
| 6,519,458 B2 * | 2/2003 | Oh et al. | 455/445 |

(Continued)

FOREIGN PATENT DOCUMENTS

GB 2361849 10/2001

(Continued)

OTHER PUBLICATIONS

European Search Report for European Application No. 06010402, 2 pages, Sep. 8, 2006.

(Continued)

*Primary Examiner* — Minh D Dao
(74) *Attorney, Agent, or Firm* — Thomas, Kayden, Horstemeyer & Risley, LLP

(57) ABSTRACT

A device and method support dialup modem access over a wireless local area and/or personal area network such as, for example, an IEEE 802.11a/b/g/n and/or IEEE 802.15.3a network. A representative embodiment permits a user of a conventional Internet web browser application to access a dialup information provider via a switched telephone network, using the wireless network. A terminal adapter comprising a wired network interface and a wireless network interface receives messaging containing dialing information from a user of a personal computer, via the wireless network. The terminal adapter establishes a dialup connection to the information provider, and exchanges information between the personal computer and the information provider via the wired and wireless interfaces. Information used for dialing may be contained within a universal resource locator received by the terminal adapter, or may be received as a result of user input on a webpage type user interface displayed by the browser application using information sent by the terminal adapter.

30 Claims, 14 Drawing Sheets

U.S. PATENT DOCUMENTS

| | | | |
|---|---|---|---|
| 6,519,636 B2 * | 2/2003 | Engel et al. | 709/223 |
| 7,009,946 B1 | 3/2006 | Kardach | |
| 7,340,747 B1 * | 3/2008 | Zeliger et al. | 719/328 |
| 7,756,475 B2 * | 7/2010 | Rambo | 455/41.2 |
| 2001/0055954 A1 | 12/2001 | Cheng | |
| 2004/0014454 A1 * | 1/2004 | Burgess et al. | 455/405 |
| 2005/0025105 A1 * | 2/2005 | Rue | 370/338 |
| 2005/0204902 A1 * | 9/2005 | Shibukawa | 84/645 |
| 2006/0129446 A1 * | 6/2006 | Ruhl et al. | 705/10 |
| 2007/0164857 A1 * | 7/2007 | Odenwald et al. | 340/539.22 |
| 2007/0248034 A1 * | 10/2007 | Hsu et al. | 370/318 |
| 2008/0062258 A1 * | 3/2008 | Bentkovski et al. | 348/50 |
| 2008/0279348 A1 * | 11/2008 | Carro | 379/88.04 |

FOREIGN PATENT DOCUMENTS

| | | |
|---|---|---|
| GB | 2361849 A | 10/2001 |
| JP | 2000253176 A | 9/2000 |
| JP | 2004266787 A | 12/2003 |

OTHER PUBLICATIONS

Kumar et al., "Medium Access Control protocols for ad hoc wireless networks: A survey", Ad Hoc Networks 4 (2006), pp. 326-358, available online at www.sciencedirect.com.

* cited by examiner

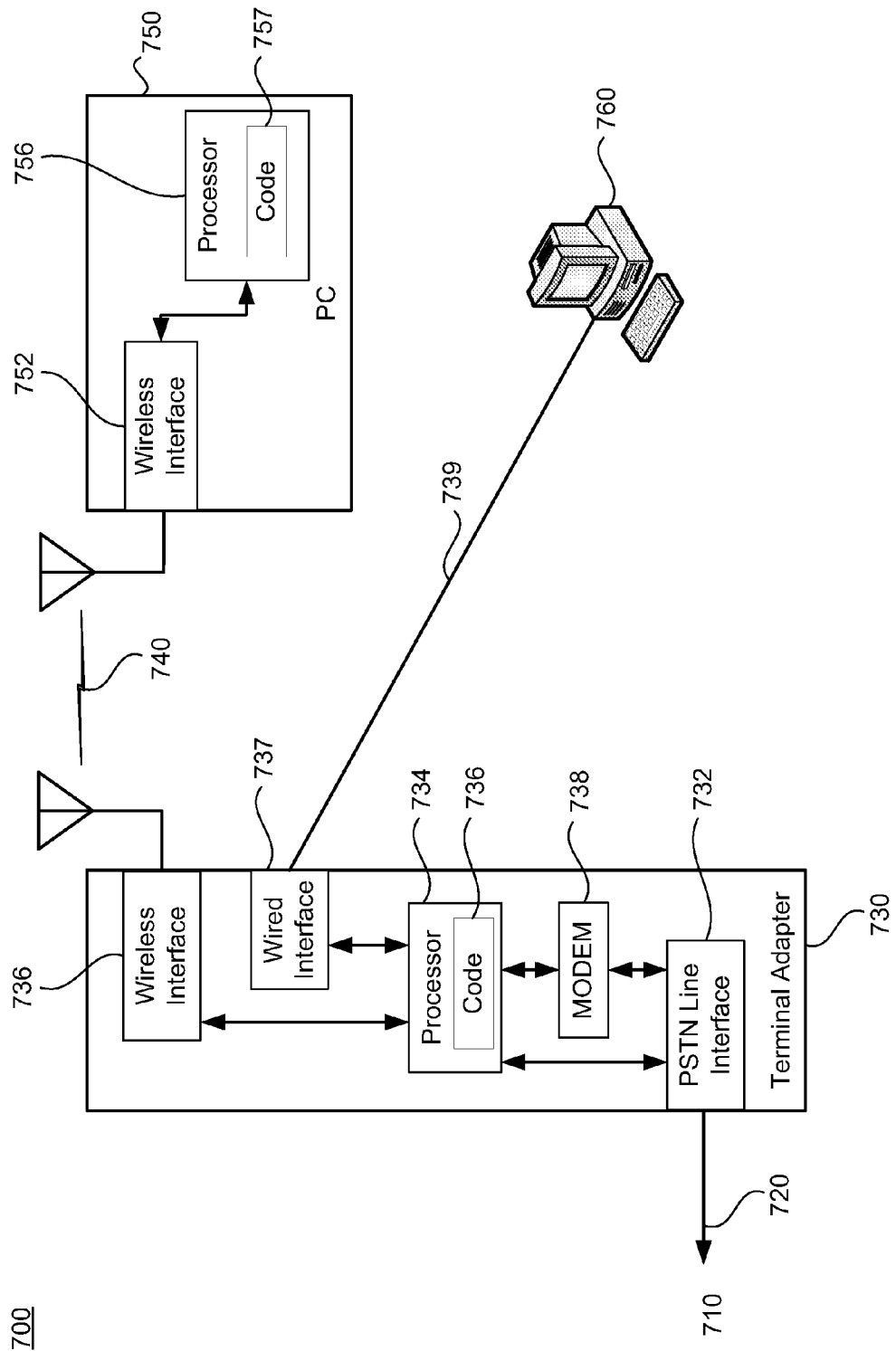

WIFI INTERFACE TO DIALUP MODEM

RELATED APPLICATIONS

The present application is a continuation of U.S. patent application Ser. No. 11/144,536 titled "WIFI INTERFACE TO DIALUP MODEM" and filed Jun. 3, 2005, now U.S. Pat. No. 7,756,475, issued Jul. 13, 2010, which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The use of wireless local area or personal area networks within home and business environments such as, for example, WiFi and Bluetooth is growing at an ever increasing rate. Such networks provide not only connectivity with other devices such as printers, computers, and cell phones, for example, but many times provide access through devices such as, for example, wireless routers and switches, information service providers located outside the premises via broadband network connections such as a digital subscriber line (DSL), a cable broadband service, and local multi-point distribution service (LMDS). Although the percentage of homes and businesses with access to such broadband services is expanding, there are still large numbers of users that have conventional dialup access to information providers but cannot get broadband service, or for which broadband service is cost-prohibitive. Such users may find dialup speed access to information satisfactory, but may also wish to enjoy the flexibility and the added mobility within their living and work spaces that may be available using a wireless local area network.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system, method, and apparatus supporting dialup data communication via a wireless local area or personal area network, substantially as shown in and/or described in connection with at least one of the figures, as set forth more completely in the claims.

These and other advantages, aspects, and novel features of the present invention, as well as details of illustrated embodiments, thereof, will be more fully understood from the following description and drawings.

BRIEF DESCRIPTION OF SEVERAL VIEWS OF THE DRAWINGS

FIG. 7 illustrates another exemplary communication system for supporting wireless local area and/or personal area network access to a conventional dial-up network, in accordance with a representative embodiment of the present invention.

DETAILED DESCRIPTION OF THE INVENTION

Aspects of the present invention related to the exchange of data over a dialup communication network employing the Internet protocol (IP). More specifically, aspects of the present invention relate to a means of supporting flexible premises access to a dialup communication link using wireless local area network technology.

Figure 1:
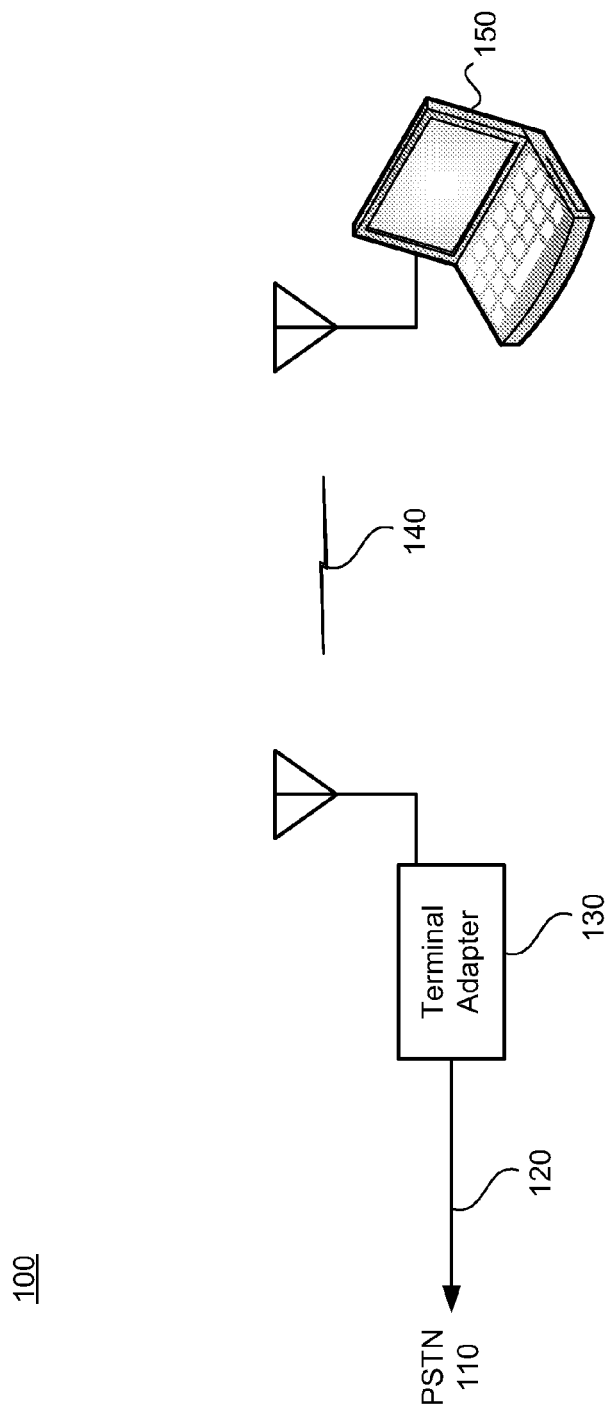
FIG. 1 shows an exemplary communication system supporting wireless local area and/or personal area network access to a conventional dial-up network, in accordance with a representative embodiment of the present invention.

FIG. 1 shows an exemplary communication system 100 supporting wireless local area and/or personal area network access to a conventional dial-up network, in accordance with a representative embodiment of the present invention. As shown in FIG. 1, the communication system 100 comprises a personal computer (PC) 150 wirelessly linked via a radio frequency (RF) air interface 140 to a terminal adapter 130. The terminal adapter 130 is communicatively coupled via a conventional telephone loop 120 to a public switched telephone network 110, and functions at least to adapt the relatively higher data rate and wireless signaling of the air interface 140, to the relatively lower data rate and analog modem signaling used over the PSTN 110. The RF air interface 140 may comprise, for example, an Institute of Electrical and Electronics Engineers (IEEE) 802.11a/b/g, and/or n compatible air interface (a.k.a., WiFi), a Bluetooth or IEEE 802.15.3a air interface, or similar wireless local or personal area network. Although depicted in FIG. 1 as a laptop computer, the PC 150 may also comprise a desktop computer, a handheld computer, a personal digital assistant, or any of a variety of other form of electronic device having a need to connect to a remote service provider via the PSTN 110. In a representative embodiment of the present invention, the communication of information via the PSTN 110 may employ, for example, a point-to-point protocol such as the protocol described in Internet Engineering Task Force (IETF) document RFC-1661 (1994).

In a representative embodiment of the present invention, a user of an electronic device such as, for example, the PC 150 of FIG. 1 may desire the freedom to move about their residence or place of business while using the PC 150 to access information resources accessible via the PSTN 110. Conventional access points and routers that allow wireless access to the information resources of a wireless network typically do so via an Ethernet or IEEE 802.3 broadband communication link, a digital subscriber line (DSL), a cable television network, or a satellite network. A representative embodiment of the present invention permits a user of an electronic device such as PC 150 without access to one of the above broadband data networks to enjoy mobility within the coverage area of a wireless local area or personal area network using a conventional telephone network such as, for example, the PSTN 110.

Figure 2:
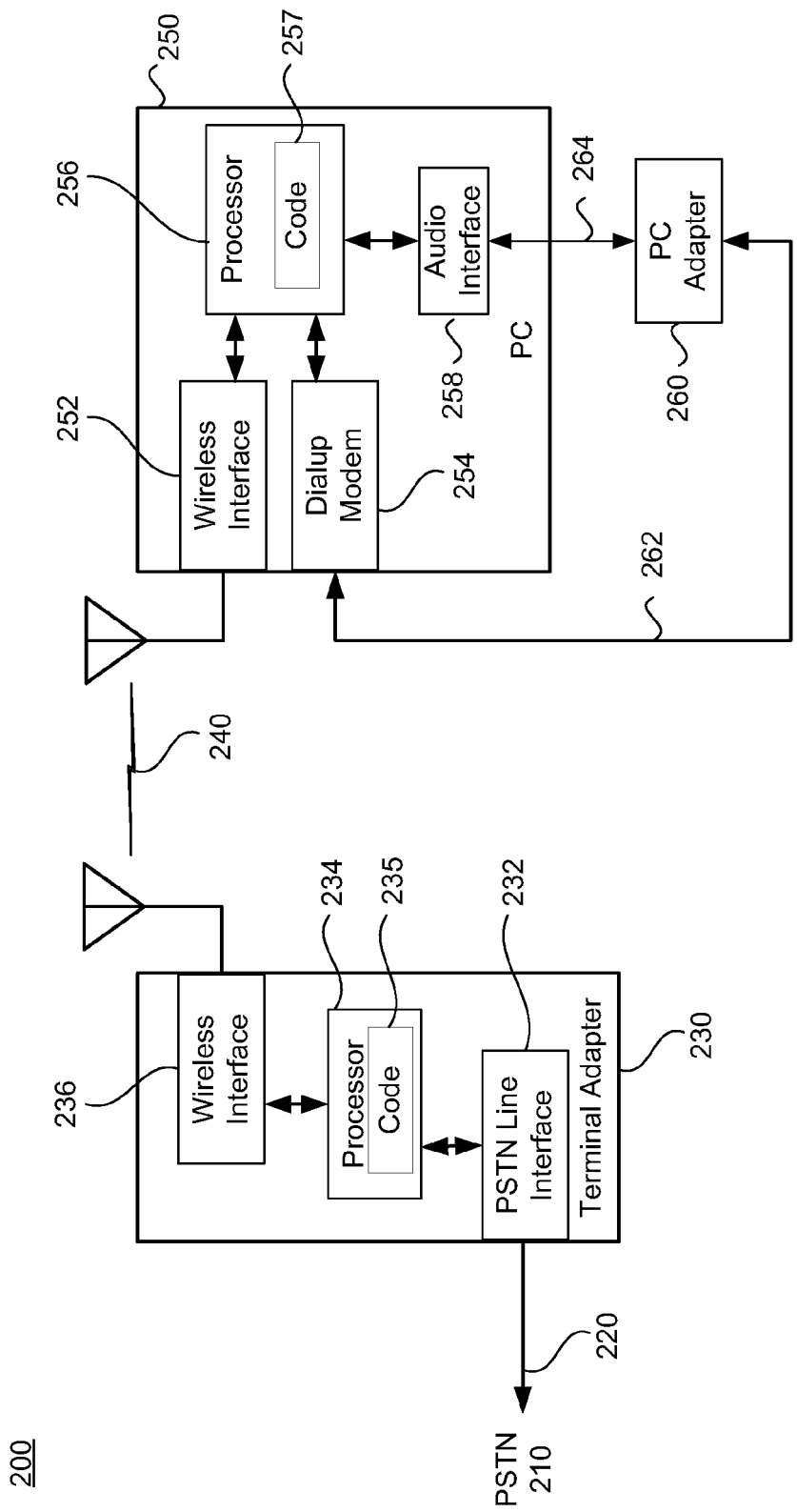
FIG. 2 illustrates an exemplary communication system for supporting wireless local area and/or personal area network access to a conventional dial-up network, in accordance with a representative embodiment of the present invention.

FIG. 2 illustrates an exemplary communication system 200 for supporting wireless local area and/or personal area network access to a conventional dial-up network, in accordance with a representative embodiment of the present invention. The communication system 200 shown in FIG. 2 comprises a personal computer (PC) 250 wirelessly linked via a radio frequency (RF) air interface 240 to a terminal adapter 230. The terminal adapter 230 is communicatively coupled via a conventional telephone loop 220 to a public switched telephone network 210, and functions at least to adapt the relatively higher data rate and wireless signaling of the air interface 240, to the relatively lower data rate and analog modem signaling used over the PSTN 210. The personal computer (PC) 250, radio frequency (RF) air interface 240, terminal adapter 230, and PSTN 210 may correspond to, for example, the personal computer (PC) 150, radio frequency (RF) air interface 140, terminal adapter 130, and PSTN 110, respectively, shown in FIG. 1. As shown in FIG. 2, the PC 250 comprises a processor 256 with code 257. The code 257 may, for example, comprise application software, an operating system, and interface code for the hardware circuitry of the PC 550. The application software may include an Internet browser, and a dialup manager to support the management of dialup modem calls with dialup modem 254, for example. The processor 250 is communicatively coupled to a wireless interface 252, a modem 254, and an audio interface 258. The wireless interface 252 functions to exchange digital information via the RF air interface 240 according to, for example, an IEEE 802.11a/b/g and/or n and/or IEEE 802.15.3a wireless network protocol. The modem 254 may comprise a conventional data modem for interfacing to a telephone subscriber loop, and capable of exchanging signaling and digital data using, for example, dial pulse, dual tone multi-frequency (DTMF), and the International Telecommunication Union (ITU) ANSI V.90/V.92 signaling protocols, respectively. The audio interface 258 may comprise circuitry for the analog-to-digital and digital-to-analog conversion of audio signals exchanged over link 264. The PC 250 is shown in FIG. 2 communicatively coupled to a PC adapter 260 that may function at least to adapt the network and modem signaling on the telephone subscriber loop interface of the modem 254, to audio signals as used by the audio interface 258.

The terminal adapter 230 of the communication system 200 of FIG. 2 comprises a processor 234 with code 235. The processor 234 is communicatively coupled to a wireless interface 236 for communicating via RF air interface 240, and a PSTN line interface 232 for communicating via the PSTN network 210. The wireless interface 236 functions at least to exchange digital information via the RF air interface 240 according to, for example, an IEEE 802.11a/b/g and/or n, and/or IEEE 802.15.3a wireless network protocol. The PSTN line interface 232 functions at least to exchange digital data and signaling information between the processor 234 and the analog signaling used by the PSTN 210. In a representative embodiment of the present invention, the communication of information via the PSTN 210 may employ, for example, a point-to-point protocol such as the protocol described in Internet Engineering Task Force (IETF) document RFC-1661 (1994).

In a representative embodiment of the present invention, the processor 256 may cause digitized audio information to be exchanged between the wireless interface 252 and the audio interface 258, conveying digital representations of network and modem signaling between the modem 254 and the terminal adapter 230 via the RF air interface 240. The signals communicated with the PC adapter 260 via link 262 may be the same as those normally used in accessing an information provider when the modem 254 is in direct communication with a telephone subscriber loop such as, for example, the telephone subscriber loop 220. In a representative embodiment of the present invention, the code 235 of the processor 234 may be arranged to cause the exchange of the digital representations of network and modem signaling between the wireless interface 236, and the PSTN line interface 232. The PSTN line interface 232 may function to convert between the analog signals used in communication via the PSTN 210, and the digital representations of network and modem signaling received and transmitted by the modem 254 of the PC 250.

Figure 3:
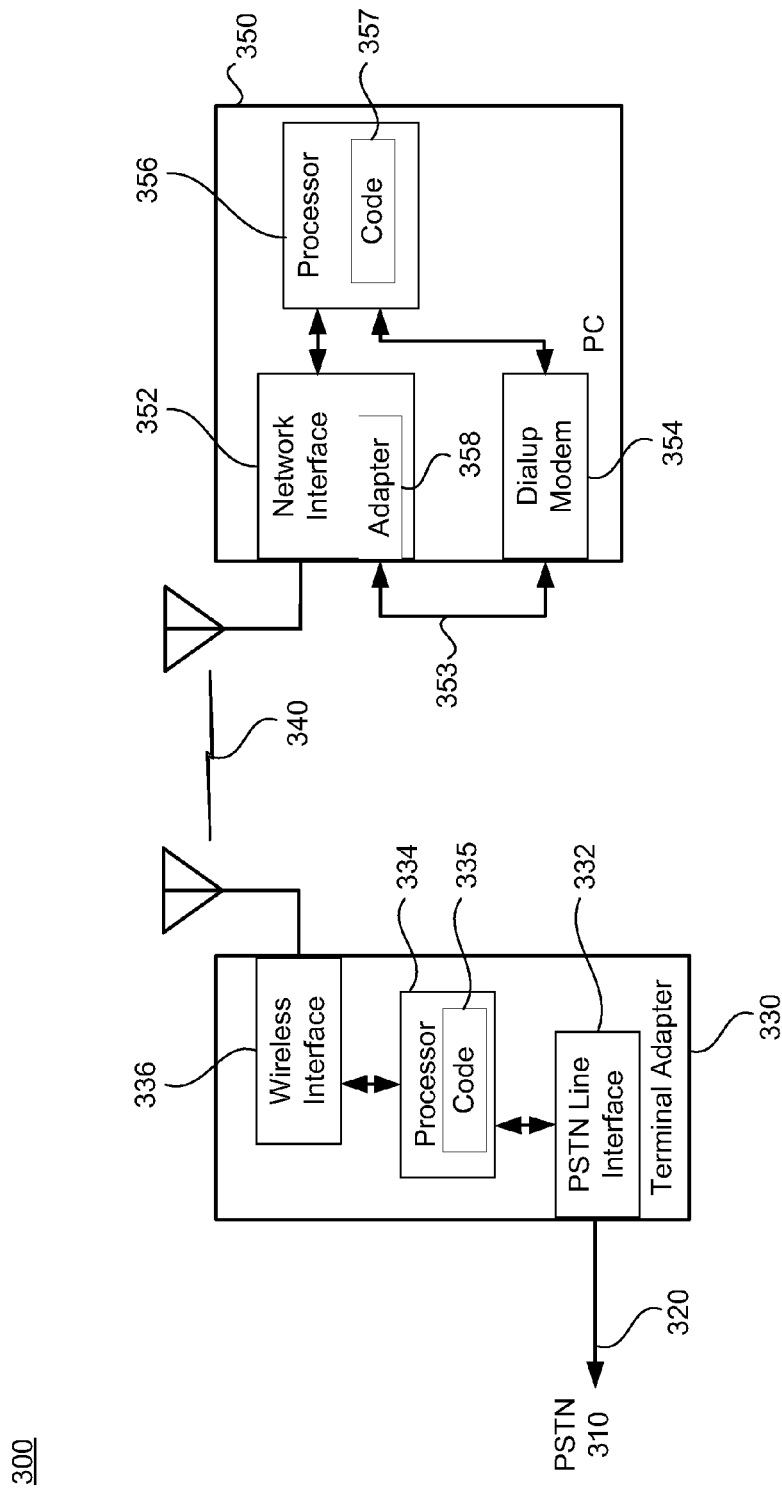
FIG. 3 illustrates another exemplary communication system for supporting wireless local area and/or personal area network access to a conventional dial-up network, in accordance with a representative embodiment of the present invention.

FIG. 3 illustrates another exemplary communication system 300 for supporting wireless local area and/or personal area network access to a conventional dial-up network, in accordance with a representative embodiment of the present invention. The communication system 300 shown in FIG. 3 is similar to the communication system 200 of FIG. 2 with the exception that the functionality of the PC adapter 260 of FIG. 2 has been integrated with that of the wireless interface 252 into a network interface 352 as adapter 358. The network interface 352 may comprise, for example, a circuit module or card such as, for example, a Personal Computer Memory Card International Association (PCMCIA) or PCCard Cardbus compatible card. An interconnect 353 may connect the dial-up modem 354 to the network interface 352 to permit the exchange of the network and modem signaling of the dialup modem 354 via the RF air interface 340 using the network interface 352. The functionality of the remaining elements of the communication system 300 of FIG. 3 may correspond to, for example, those elements of FIG. 2 having similar numbering (e.g., processor 334 of FIG. 3 corresponding to processor 234 of FIG. 2).

Figure 4:
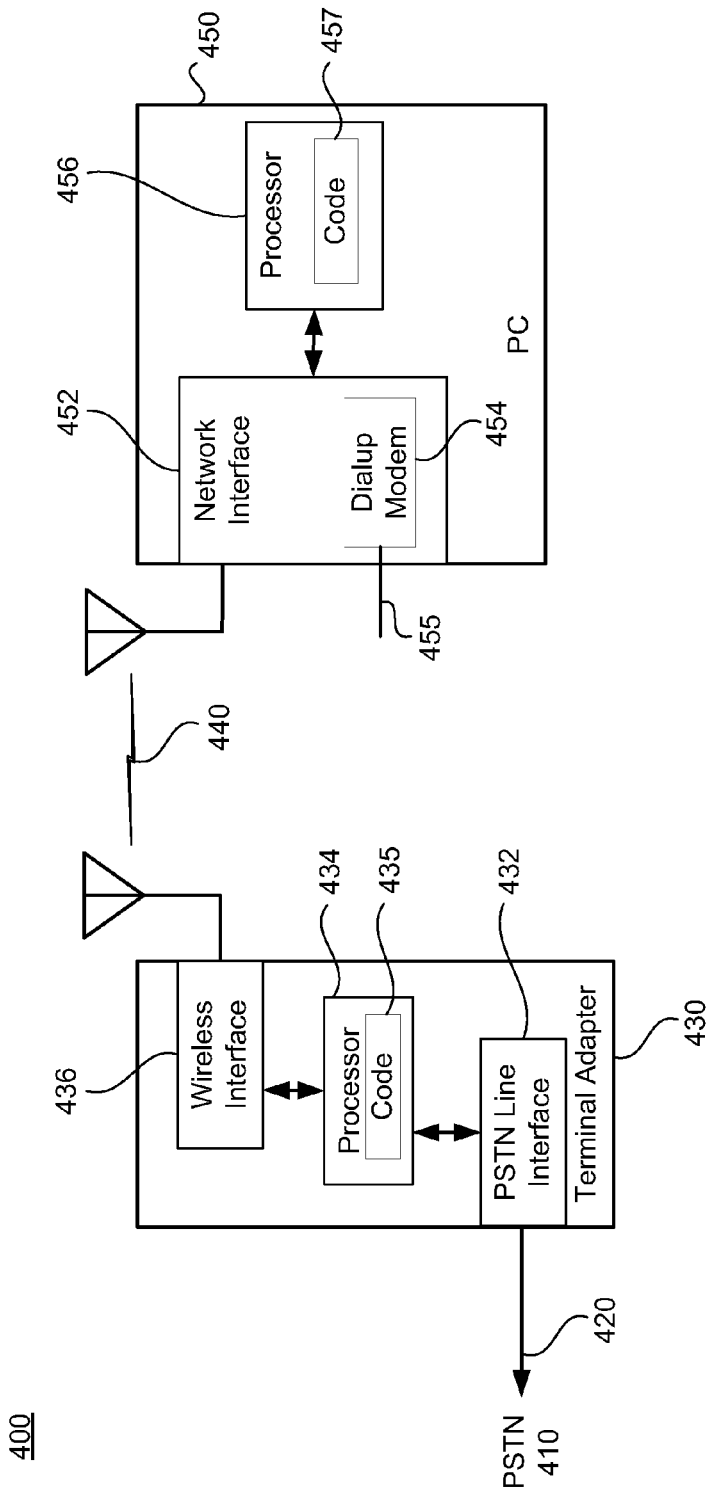
FIG. 4 illustrates yet another exemplary communication system for supporting wireless local area and/or personal area network access to a conventional dial-up network, in accordance with a representative embodiment of the present invention.

FIG. 4 illustrates yet another exemplary communication system 400 for supporting wireless local area and/or personal area network access to a conventional dial-up network, in accordance with a representative embodiment of the present invention. The communication system 400 shown in FIG. 4 is similar to the communication system 300 of FIG. 3 with the exception that the functionality of the dialup modem 354 of FIG. 3 has been integrated with that of the wireless interface 352 into a network interface 452. The network interface 452 may comprise, for example, a circuit module or card such as, for example, a Personal Computer Memory Card International Association (PCMCIA) or PCCard Cardbus compatible card. The dialup modem 454 may, for example, employ a digital signal processor (not shown) in the transmission and reception of network and modem signaling, and digital representations of such signals may be conveyed to those portions of the network interface 452 used for the processing of wireless signals of the RF air interface 440, without conversion to/from analog representations of the network and modem signaling. Integration of the dialup modem within the network interface 452 provides functionality like that of the communication system of FIG. 3 without the use of the adapter 358.

Figure 5A:
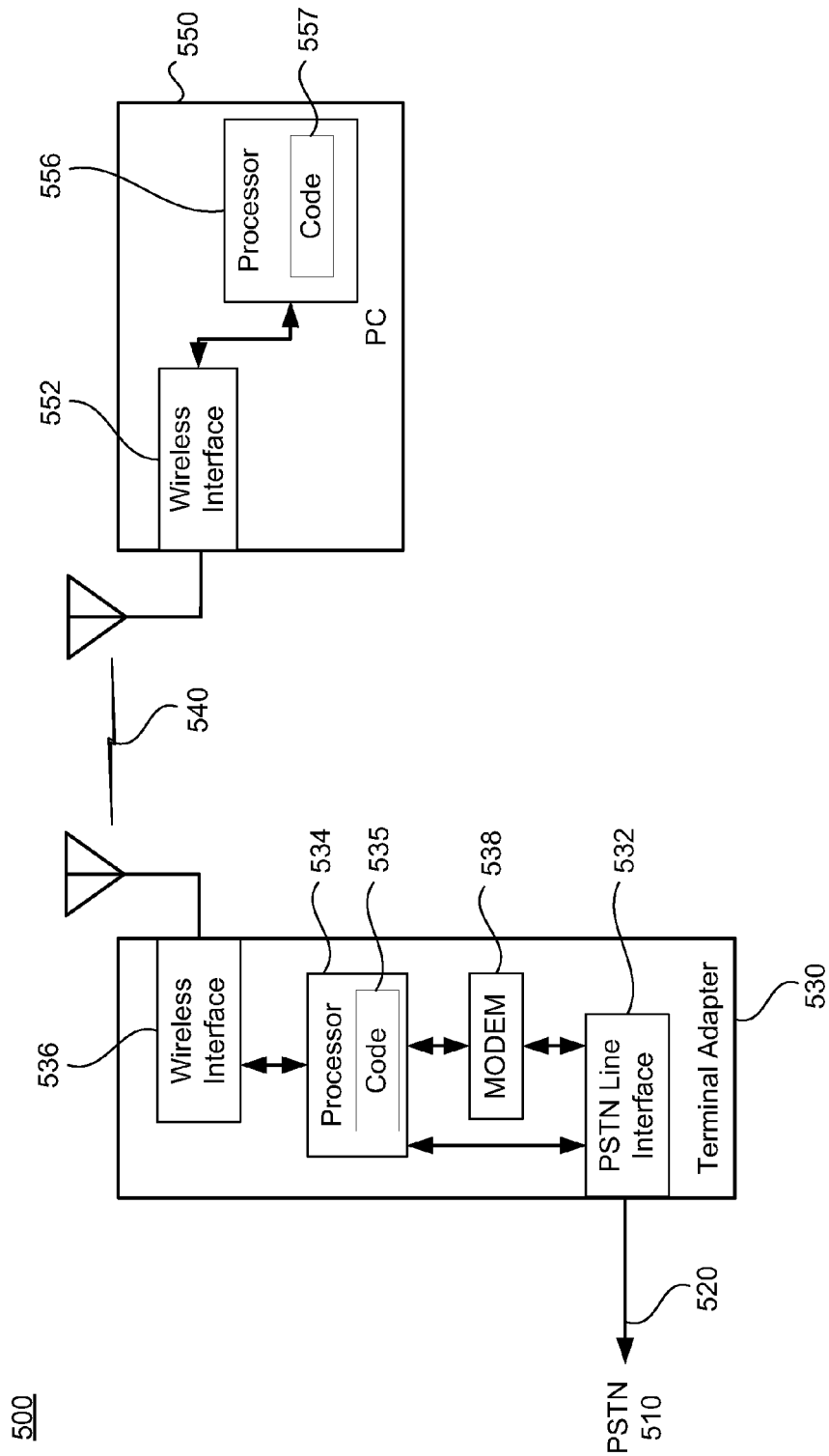
FIG. 5A illustrates an exemplary communication system for supporting wireless local area and/or personal area network access to a conventional dial-up network, in accordance with a representative embodiment of the present invention.

FIG. 5A illustrates an exemplary communication system 500A for supporting wireless local area and/or personal area network access to a conventional dial-up network, in accordance with a representative embodiment of the present invention. The communication system 500A shown in FIG. 5A comprises a personal computer (PC) 550 wirelessly linked via a radio frequency (RF) air interface 540 to a terminal adapter 530. The terminal adapter 530 is communicatively coupled via a conventional telephone loop 520 to a public switched telephone network 510, and functions at least to adapt the relatively higher data rate and wireless signaling of the air interface 540, to the relatively lower data rate and analog modem signaling used over the PSTN 510. The personal computer (PC) 550, radio frequency (RF) air interface 540, and PSTN 510 may correspond to, for example, the personal computer (PC) 450, radio frequency (RF) air interface 440, and PSTN 410, respectively, shown in FIG. 4. As shown in FIG. 5A, the PC 550 comprises a processor 556 with code 557. The processor 550 is communicatively coupled to a wireless interface 552. The wireless interface 552 functions to exchange digital information via the RF air interface 540 according to, for example, an IEEE 802.11a/b/g and/or n, and/or IEEE 802.15.3a wireless network protocol.

The terminal adapter 530 of the communication system 500A of FIG. 5A comprises a processor 534 with machine-readable storage containing code 535. The processor 534 is communicatively coupled to a wireless interface 536 for communicating via RF air interface 540, and to a dialup modem 538 and PSTN line interface 532 for communicating via the PSTN network 510. The wireless interface 536 functions at least to exchange digital information via the RF air interface 540 according to, for example, an IEEE 802.11a/b/g and/or n, and/or IEEE 802.15.3a wireless network protocol. The dialup modem 538 and PSTN line interface 532 function at least to exchange digital data and signaling information between the processor 534 and the analog signaling used by the PSTN 510.

In one representative embodiment of the present invention, the code 557 of the processor 556 may, for example, comprise a software application, a conventional operating system, software to interface between the operating system and the hardware circuitry of the PC 550 (e.g., a wireless interface) such as a set of drivers, and other application code as is used for communication via conventional wireless local area and personal area communication networks. For example, the code 557 may comprise an Internet browser such as the Microsoft Internet Explorer browser application by Microsoft Corporation, and may operate in cooperation with a compatible operating system such as, for example, the Windows operating system by Microsoft Corporation, and driver software to communicate via the RF air interface 540. Such communication may be the same as that occurring when the PC 550 operates in a wireless local area or personal area network supported by a broadband gateway, access point or router providing wireless local area or personal area network access a broadband network such as, for example, a DSL, cable television, or satellite network as described above. In a representative embodiment of the present invention, however, broadband network access may not be available. Such a representative embodiment may employ a dial-up connection such as the dial-up link supported by the PSTN line interface 532 linked via the conventional telephone loop 520 to the PSTN network 510, for example. In a representative embodiment of the present invention, the code 557 of processor 556 may be configured to operate as though in a wireless local area network (LAN) situation, and may not involve the use of dial-up manager software as described above with respect to the communication systems 200, 300, 400 of FIGS. 2, 3, and 4.

The terminal adapter 530 in such a representative embodiment in accordance with the present invention may, for example, function so as to intercept and analyze (e.g., parse) hypertext transfer protocol (HTTP) messaging received by the wireless interface 536 (e.g., from the PC 550) in order to recognize a universal resource locator (URL) of a particular form. The interception and analysis (e.g., parsing) of HTTP messaging from the PC 550 by the terminal adapter 530 may be enabled, for example, only when the processor 534 determines that the PSTN line interface 532 is not currently off-hook, or that the modem 538 is not currently engaged in communication.

In such a representative embodiment of the present invention, the particular form of the URL to be recognized may include an indication that a dialable directory number is embedded within the URL, for example, and that the HTTP request represents a user request to establish a modem link with a dialup service provider. For example, in one representative embodiment of the present invention, a URL of the form http://DIAL.1.630.555.1212/ may be interpreted by the terminal adapter 530 as a request to dial the directory number "1-630-555-1212". In another representative embodiment, a URL of the form http://DIAL/ may cause the terminal adapter 530 to respond to the web browser application at the PC 550 with appropriate hypertext markup language (HTML) for the display of a web page prompting for entry of a directory number to be dialed.

Figure 5B:
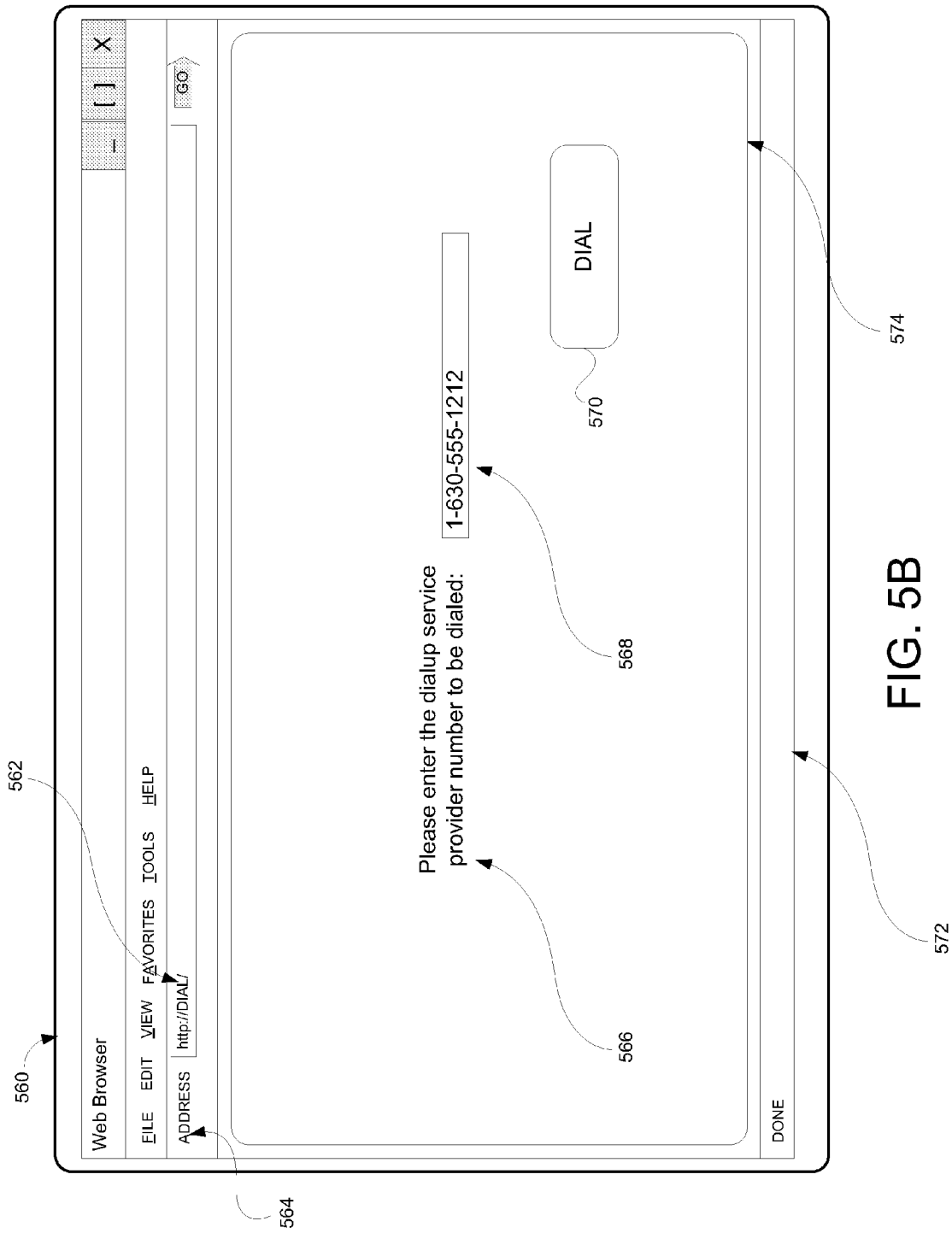
FIG. 5B shows an illustration of a display screen showing an exemplary web page comprising a user prompt and a directory number field that may be displayed by an Internet browser application such as, for example, the Internet Explorer web browser application by Microsoft Corporation, in accordance with a representative embodiment of the present invention.

FIG. 5B shows an illustration of a display screen 560 showing an exemplary web page 574 comprising a user prompt 566 and a directory number field 568 that may be displayed by an Internet browser application 572 such as, for example, the Internet Explorer web browser application by Microsoft Corporation, in accordance with a representative embodiment of the present invention. The display screen 560 may correspond to, for example, the display of the PC 550 of FIG. 5A. The Internet browser application 572 may be initiated by a user in anticipation of accessing an information service provider. The web page 574 may be displayed by the Internet browser application 572 in response to, for example, an HTTP Response message received from a terminal adapter such as the terminal adapter 530 of FIG. 5A, for example. The terminal adapter 530 may generate such messaging upon receiving the URL 562 of the address field 564 in, for example, an HTTP Request message. The URL 562 may have a particular or predefined format indicating the desire of the user to place a dialup call, as described above. The user prompt 566 of the web page 574 may instruct the user of the PC 550 to enter the directory number of the dialup service provider into the directory number field 568. The user may then enter a directory number and select the DIAL button 570, which may cause the sending to the terminal adapter of an HTTP Request message posting the directory number field 568. The terminal adapter 530 may then use the directory number field in the received HTTP message to cause dialing via a conventional PSTN line such as PSTN line 520 of FIG. 5A, for example, and connection to the associated dialup information service provider.

In another representative embodiment of the present invention, the code 557 of processor 556 in the PC 550 of FIG. 5A may be configured to operate as though in a dial-up situation, and may employ conventional dial-up manager software such as that described above with respect to the communication systems 200, 300, 400 of FIGS. 2, 3, and 4. In such a representative embodiment, a conventional dialup manager in the code 557 may, for example, employ interface code in the PC 550 that communicates with the code 535 of the processor 534 in the terminal adapter 530, via the wireless interface 552, RF air interface 540, and wireless interface 536. Instead of directly managing a dialup modem such as, for example, the dialup modems 254, 354, 454 of FIGS. 2, 3 and 4, the interface code may permit application software such as, for example, a dialup manager or Internet browser, on the PC 550 to control the behavior of the modem 538 and line interface 532 in the terminal adapter 530, as though they resided within or were in direct local communication with the PC 550. Such interface code may support the use of the RF air interface 540 for the exchange, between the processor 556 and the processor 534, of information to/from the PSTN 510 from/to a software application, and of status and control information related to the establishment and management of a dialup network connection by the application software on the PC 550.

Figure 6:
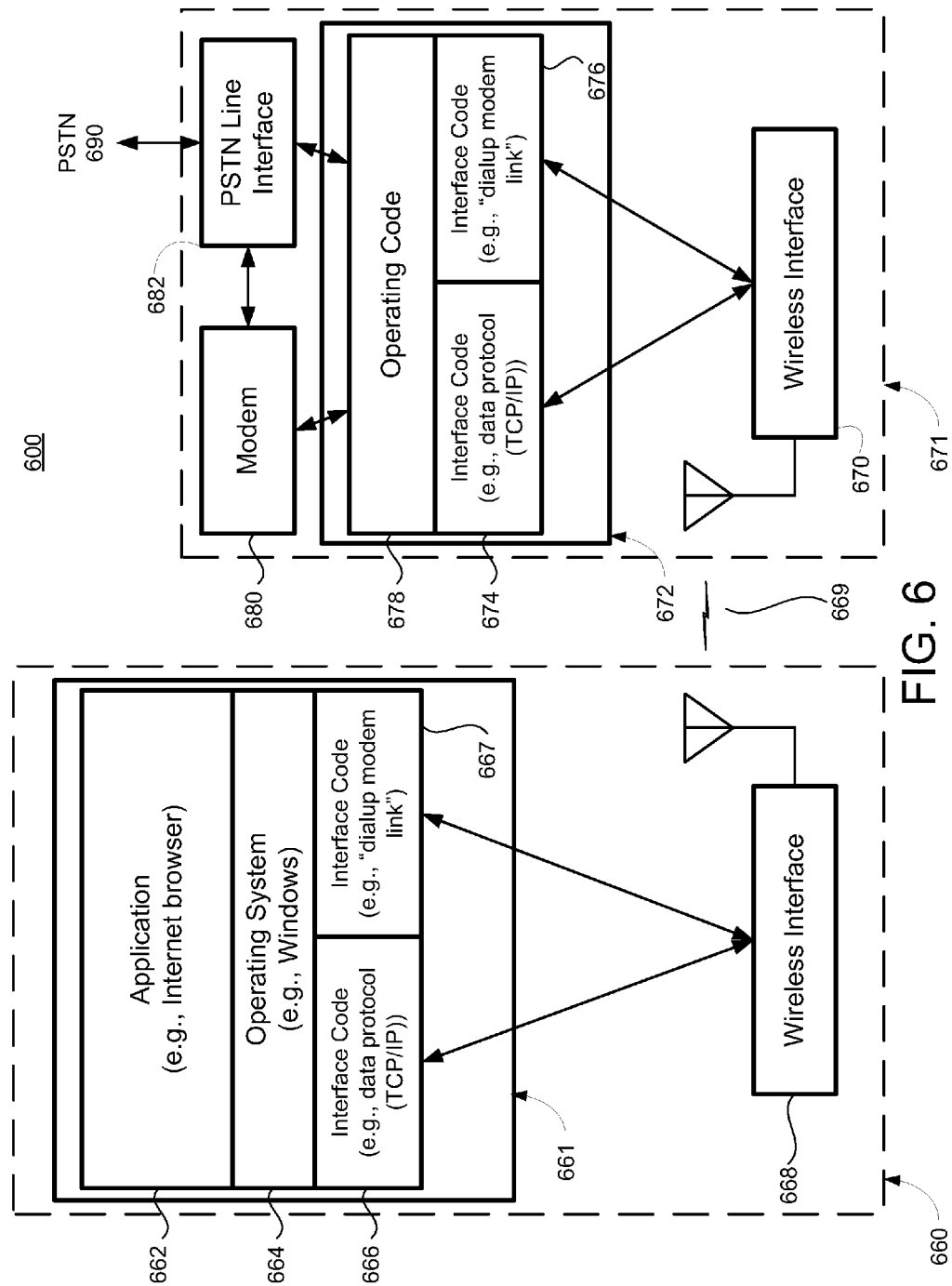
FIG. 6 shows a block diagram illustrating an exemplary communication system of a communication system that may correspond to, for example, the communication system of FIG. 5A, in accordance with a representative embodiment of the present invention.

FIG. 6 shows a block diagram illustrating an exemplary communication system 600 that may correspond to, for example, the communication system 500 of FIG. 5A, in accordance with another representative embodiment of the present invention. The architecture shown in FIG. 6 comprises a personal computer (PC) 660 communicatively coupled via an RF air interface 669 to a terminal adapter 671. Elements of the PC 660 and terminal adapter 671 that are shown in FIG. 5A such as, for example, the processors in PC 660 and terminal adapter 671 have been omitted, for reasons of clarity. The PC 660 and terminal adapter 671 may correspond to, for example, the PC 550 and terminal adapter 530, respectively, of FIG. 5A. The PC 660 in communication system 600 of FIG. 6 comprises code 661 that may correspond to, for example, the code 557 of the PC 550 of FIG. 5A, and code 672 that may correspond to, for example, the code 535 of the terminal adapter 530 of FIG. 5A. The code 661 and code 672 may comprise executable code resident in machine readable storage in the PC 660 and terminal adapter 671, respectively. As shown in FIG. 6, the code 661 may interact with hardware circuitry of the PC 660, including wireless interface 668 that may correspond to, for example, the wireless interface 552 of FIG. 5A. The code 672 may interface with the hardware circuitry of the terminal adapter 671 including, for example, the wireless interface 670 that may correspond to the wireless interface 536 of FIG. 5A, and the modem 680 and PSTN line interface 682 that may correspond to the modem 538 and PSTN line interface 532, respectively, of the terminal adapter 530 in FIG. 5A.

As shown in the illustration of FIG. 6, the code 661 may comprise application code 662, operating system (O/S) code 664, and interface code 666, 667 that may handle the exchange of information for the application code 662 and O/S code 664. The application code 662 may comprise, for example, an Internet browser application and a dialup manager as described above with respect to FIGS. 2, 3, and 4. The operating system code 664 may provide an application program interface (API) that permits the application code 662 to access the hardware of the PC 660 such as, for example, the wireless interface 668, by employing the interface code 666, that may handle the exchange of data via the wireless interface 668, and interface code 667, that may handle the exchange of status and control information associated with establishment and maintenance of a dialup modem link. In a representative embodiment of the present invention, the application code 662 may function in a dialup fashion via the wireless link provided by the wireless interface 668, RF air interface 669, and wireless interface 670, without requiring changes to the application code 662 from that used with a dialup modem that is local to the PC 660. The API provided by the operating system 664 and employed by the application code 662 may be unchanged from that employed in communication systems such as those shown in FIGS. 2, 3, and 4. In a representative embodiment of the present invention, the interface code 666, 667 may be arranged to make the remotely located modem 680 and PSTN line interface 682 appear as a dialup modem local to the PC 660. The interface code 666, 667 may be arranged to cooperatively use the wireless interface 668 to exchange both data, and status and control information via the RF air interface 669 with the terminal adapter 671.

In a representative embodiment of the present invention, the code 672 of the terminal adapter 671 of FIG. 6 may comprise operating code 678, and interface code 674, 676. The interface code 674, 676 may, for example, function to cooperatively exchange data, and status and control information, via the wireless interface 670, RF air interface 669, and the wireless interface 668, with the interface code 666, 667, respectively, in the code 661 of, for example, the PC 660. The communication of status and control information between the interface code 667 at the PC 660, for example, and the interface code 676 in the terminal adapter 671, for example, permits the application code 662 to establish and maintain a dialup modem link using the modem 680 and line interface 682 of terminal adapter 671, for example, as if the dialup modem functionality were physically present at the PC 660. For example, a user of a software application such as, for example, an Internet browser may wish to establish a dialup link to an Internet service provider (ISP) via a public switched telephone network connection like the PSTN 690. The user may employ a dialup manager such as that provided by the Windows operating system, for example, and may provide a directory number associated with the ISP. The status and control information normally exchanged between application code such as the application code 662 (e.g., an Internet browser) and a dialup modem resident on a PC such as, for example, the PC 250 of FIG. 2, may instead be exchanged with the hardware circuitry of the modem 680 and the PSTN line interface 682, via the operating system 664, the interface code 667, the wireless interface 668, the RF air interface 669, the wireless interface 670, the interface code 676, and the operating code 678.

A representative embodiment of the present invention may convey out-of-band status and control signals such as, for example, request-to-send (RTS) and clear-to-send (CTS) that may, for example, be used in an information flow control mechanism, by communicating such status and control information between the interface code 667 of the PC 660, and the interface code 676 of terminal adapter 671. For example, the terminal adapter 671 may have limited buffer space for the transmission of application data via the PSTN 690. Application code 662 and/or O/S code 664 may, for example, employ RTS/CTS flow control in managing information flow when in communication using a dialup modem on a PC such as, for example, a PC with a directly connected dialup modem. A representative embodiment of the present invention may convey out-of-band status and control signals such as, for example, RTS, CTS, data set ready (DSR), data terminal ready (DTR), CD (carrier detect), ring indicator (RI), and a variety of others between a terminal adapter such as the terminal adapter 671 of FIG. 6 and a PC such as the PC 660 of FIG. 6, by employing the interface code 667, 676, the wireless interfaces 668, 670, and the RF air interface 669. The states and/or transitions of out-of-band signals such as those listed above may be represented in messaging exchanged between the interface code 667 at the PC 660, and the interface code 676 at the terminal adapter 671. In this manner, the application code 662 and/or O/S 664 may exchange such status and control information with the remotely located modem 680 and PSTN line interface 682, via the interface code 676 and operating code 678. This permits a representative embodiment of the present invention to wirelessly communicate flow control and other out-of-band signals between a PC at a first location, and a terminal adapter at a second location, via a wireless LAN.

Another representative embodiment of the present invention may support in-band signaling supporting functionality such as, for example, flow control. In such an arrangement, the interface code 666, 667 at the PC 660, and the interface code 674, 676 at the terminal adapter 671 may, for example, be cognizant of predefined values of data employed by the application code 662 and/or O/S 664 for flow control purposes. In a representative embodiment of the present invention, the interface code 666, 667 on PC 660, and the interface code 674, 676 may support in-band signaling for flow control and similar functionality. For example, data values representing industry conventions XON and XOFF (e.g., DC1/hexadecimal 11 and DC2/hexadecimal 13) may be employed. Other data values and in-band signaling functionality may also be supported without departing from the spirit and scope of the present invention.

In a similar fashion, the data that might typically be exchanged between the application code 662 (e.g., the Internet browser) and an ISP using an internal or directly connected dialup modem of a PC such as the PC 250 of FIG. 2, for example, may instead be exchanged with the ISP, via the operating system 664, the interface code 666, the wireless interface 668, the RF air interface 669, the wireless interface 670, the interface code 674, the operating code 678, the modem 680, and the PSTN line interface 682. Together, the interface code 674 and the operating code 678 may, for example, operate to perform adaptation of the protocol used over the wireless interface 670 (e.g., TCP/IP) from/to the protocol used for data information exchanged via the PSTN network connection 690 using the modem 680 and PSTN line interface 682 such as, for example, support of a point-to-point (PPP) dialup protocol such as the IETF RFC-1661 protocol described above. Although the above discussion has provided an example where the application code 662 comprises an Internet browser, this does not represent a specific limitation of the present invention. A representative embodiment of the present invention may be employed with a variety of software applications without departing from the spirit and scope of the present invention.

FIG. 7 illustrates another exemplary communication system 700 for supporting wireless local area and/or personal area network access to a conventional dial-up network, in accordance with a representative embodiment of the present invention. The communication system 700 shown in FIG. 7 is similar to the communication system 500 of FIG. 5A and communication system 600 of FIG. 6, with the exception that terminal adapter 730 of FIG. 7 also comprises a wired network interface 737 communicatively coupled to a personal computer (PC) 760. As in the communication system 500 of FIG. 5A, the communication system 700 shown in FIG. 7 comprises a personal computer (PC) 750 wirelessly linked via a radio frequency (RF) air interface 740 to a terminal adapter 730. The terminal adapter 730 is communicatively coupled via a conventional telephone loop 720 to a conventional public switched telephone network (PSTN) 710, and functions at least to adapt the relatively higher data rate and wireless signaling of the air interface 740, and the relatively higher data rate of the wired link 739 coupled to the wired interface 737, to the relatively lower data rate and analog modem signaling used over the PSTN 710. The wired link 739 may comprise, for example, a wired Ethernet link compatible with IEEE 802.3. The personal computer (PC) 750, the radio frequency (RF) air interface 740, the terminal adapter 730, and the PSTN 710 may correspond to, for example, the personal computer (PC) 550, the radio frequency (RF) air interface 540, the terminal adapter 530, and the PSTN 510, respectively, shown in FIG. 5A. As shown in FIG. 7, the PC 750 comprises a processor 756 with machine-readable storage containing code 757. The processor 756 is communicatively coupled to a wireless interface 752. The wireless interface 752 functions to exchange digital information via the RF air interface 740 according to, for example, an IEEE 802.11a/b/g and/or n, and/or IEEE 802.15.3a wireless network protocol.

The terminal adapter 730 of the communication system 700 of FIG. 7 comprises a processor 734 with machine-readable storage containing code 735. The processor 734 is communicatively coupled to a wireless interface 736 for communicating via RF air interface 740, and to a dialup modem 738 and PSTN line interface 732 for communicating via the subscriber loop 720 and the PSTN network 710. The wireless interface 736 functions at least to exchange digital information via the RF air interface 740 according to, for example, an IEEE 802.11a/b/g and/or n, and/or IEEE 802.15.3a wireless network protocol. The dialup modem 738 and PSTN line interface 732 function at least to convert digital data and signaling information between the processor 734 and the analog signaling compatible with the PSTN 710. In a representative embodiment of the present invention, the communication of information via the PSTN 710 may employ, for example, a point-to-point protocol such as the protocol described in Internet Engineering Task Force (IETF) document RFC-1661 (1994).

In a representative embodiment of the present invention, the terminal interface 730 may support access by either or both of PC 750 and PC 760 to dialup information service providers via the PSTN 710. A representative embodiment of the present invention may also support communication between the PC 750 and the PC 760 via air interface 740 and wired link 739.

Figure 8A:
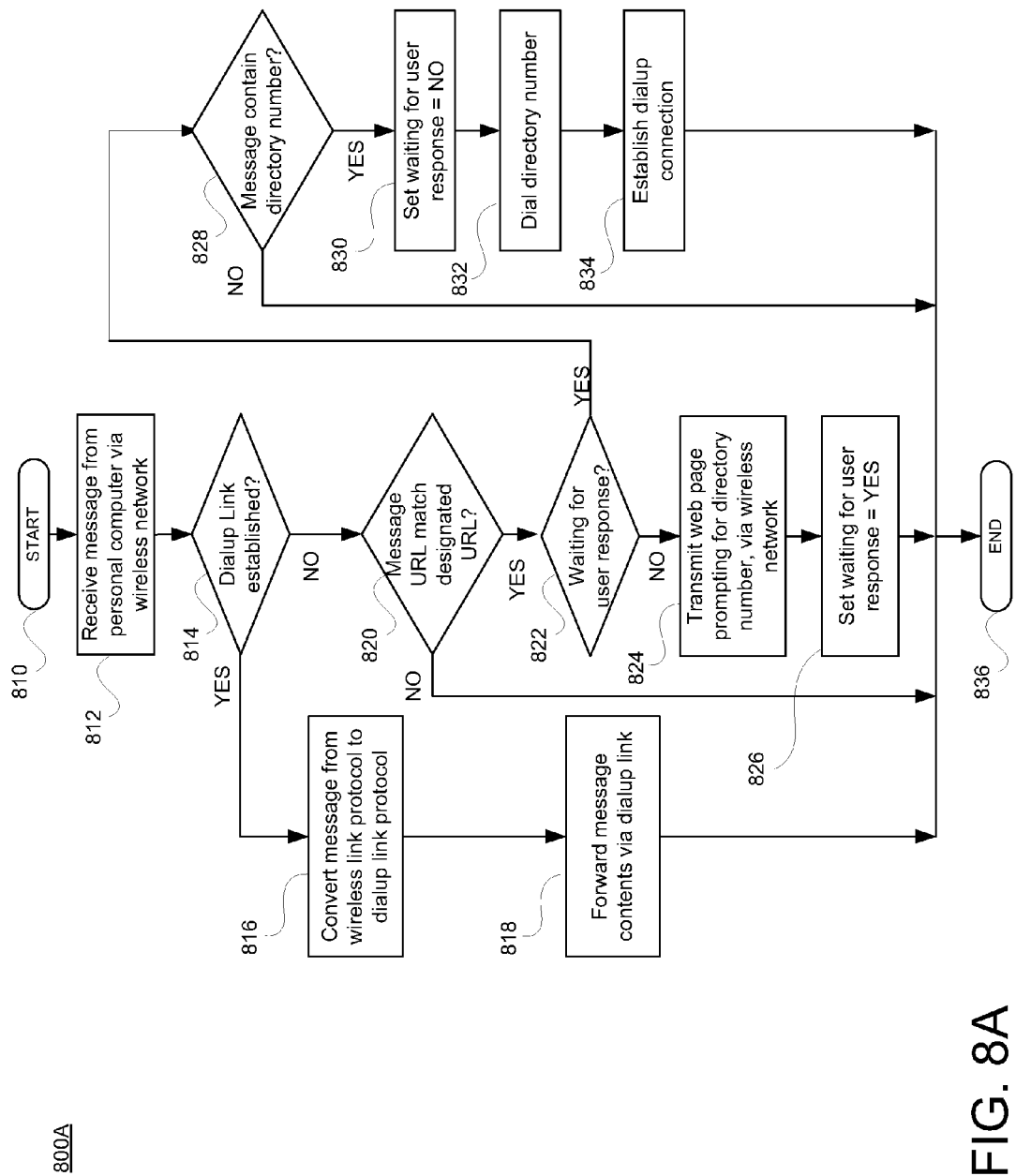
FIG. 8A is a flowchart of an exemplary method of operating the wireless to dialup path of a terminal adapter supporting wireless local area and/or personal area network access via a conventional public switched telephone network (PSTN) loop such as, for example, the terminal adapter of FIG. 5A, in accordance with a representative embodiment of the present invention.

FIG. 8A is a flowchart 800A of an exemplary method of operating the wireless to dialup path of a terminal adapter supporting wireless local area and/or personal area network access via a conventional public switched telephone network (PSTN) loop such as, for example, the terminal adapter 530 of FIG. 5A, in accordance with a representative embodiment of the present invention. As an aid to understanding the method illustrated in FIG. 8A, the following discussion makes reference to the elements of FIGS. 5A and 5B. The method of FIG. 8A begins when a terminal adapter having a wireless interface such as, for example, the terminal adapter 530 with wireless interface 536 is powered up (block 810). At some later point in time, the terminal adapter 530 receives a message via the wireless network supported by the wireless interface 536 such as, for example, the RF air interface 540 (block 812). The message may be, for example, an HTTP message, and the wireless network may be, for example, an IEEE 802.11a/b/g/n-compatible wireless area network or an IEEE 802.15.3a-compatible personal area network.

Upon receipt of the message, it is determined whether a dialup connection via, for example, the modem 538 and the PSTN line interface 532 is already established (block 814). If a dialup connection is already established, the received message may be forwarded via the dialup connection (block 816). If, however, a dialup connection is not already established, a check is made whether the universal resource locator (URL) in the message matches a URL designated for use in establishing dialup connections such as, for example, "http://DIAL/" (block 818). If the URL in the message is not the designated URL, the message may be ignored, and the method of FIG. 8A may end (block 830). If, however, the URL does match the designated URL, a check may be made to determine whether the terminal adapter 530 is waiting for a response from the user of the web browser that is wirelessly communicatively coupled to the terminal adapter 530. If the terminal adapter 530 is not waiting for a user response, the terminal adapter 530 may send a web page prompting the user to enter the directory number of a dialup information service provider (block 822).

If the terminal adapter 530 is waiting for a user response, a determination is made whether the message contains a directory number (block 824). If the message does not contain a directory number, the message may be ignored, and the method of FIG. 8A ends (block 830). If the received message does contain a directory number, the terminal adapter 530 dials the directory number (block 826), and establishes a connection with the dialup information service provider (block 828). The method of FIG. 8A then ends (block 830). Although the illustration of FIG. 8A shows the method as ending, the method may be part of a loop that is repeatedly performed in order to cause communication of messages between the wireless interface 536 and the PSTN line interface 532, for example.

Figure 8B:
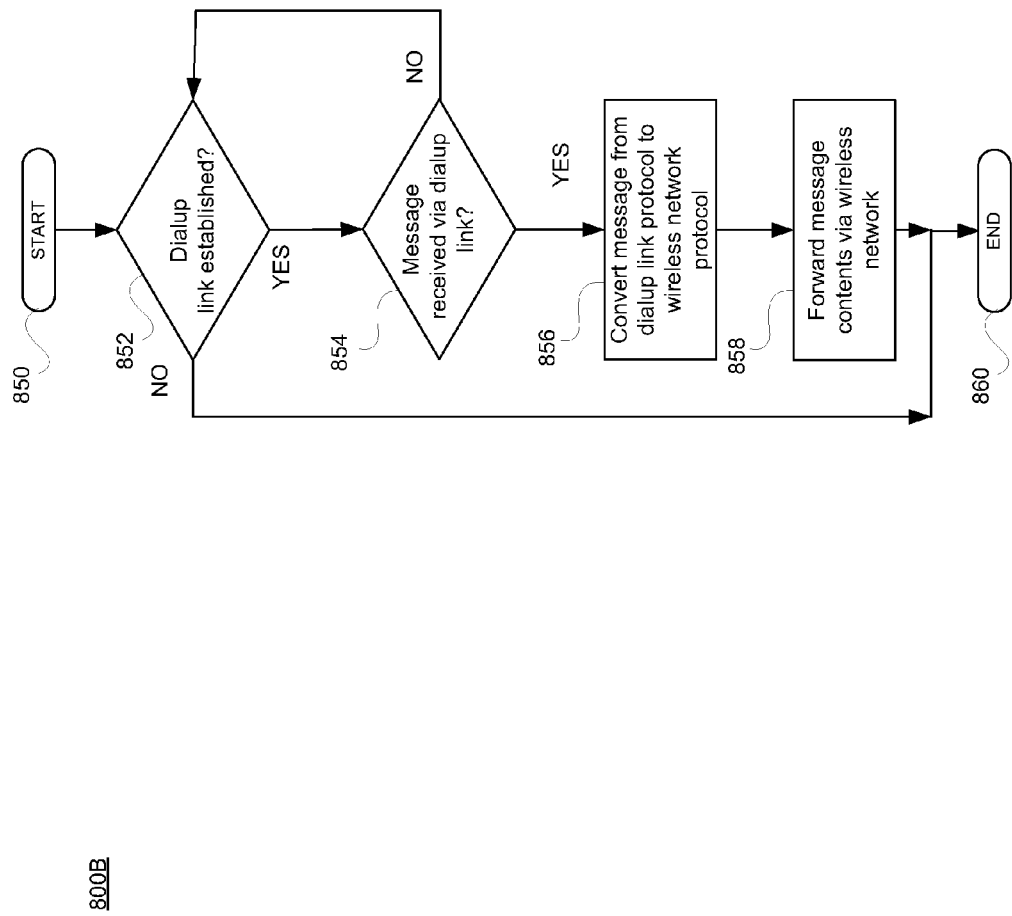
FIG. 8B is a flowchart of an exemplary method of operating the dialup-to-wireless path of a terminal adapter supporting wireless local area and/or personal area network access via a conventional public switched telephone network (PSTN) loop such as, for example, the terminal adapter of FIG. 5A, in accordance with a representative embodiment of the present invention.

FIG. 8B is a flowchart 800B of an exemplary method of operating the dialup-to-wireless path of a terminal adapter supporting wireless local area and/or personal area network access via a conventional public switched telephone network (PSTN) loop such as, for example, the terminal adapter 530 of FIG. 5A, in accordance with a representative embodiment of the present invention. As an aid to understanding the method illustrated in FIG. 8B, the following discussion makes reference to the elements of FIGS. 5A and 5B. The method of FIG. 8B begins when a terminal adapter having a wireless interface such as, for example, the terminal adapter 530 with wireless interface 536 is powered up (block 850). At some later point in time the terminal adapter 530 may determine whether a dialup connection is established via the PSTN line interface 532 (block 852). If a dialup connection is not presently active and established, the method may end (block 858). If, however, a dialup connection is established, a check may be made as to whether a message has been received via the dialup connection, for example, via modem 538 and PSTN line interface 532. If a message has not been received, the method of FIG. 8B may end (block 858). If, however, a message has been received and is ready to be forwarded, the terminal adapter 530 may forward the received message via the wireless interface 536 to, for example, the wireless interface 552 of the PC 550. Once the message has been forwarded, the method of FIG. 8B then ends (block 858). Although the illustration of FIG. 8B shows the method as ending, the method may be part of a loop that is repeatedly performed in order to cause communication of messages between the PSTN line interface 532 and the wireless interface 536, for example.

Figure 9A:
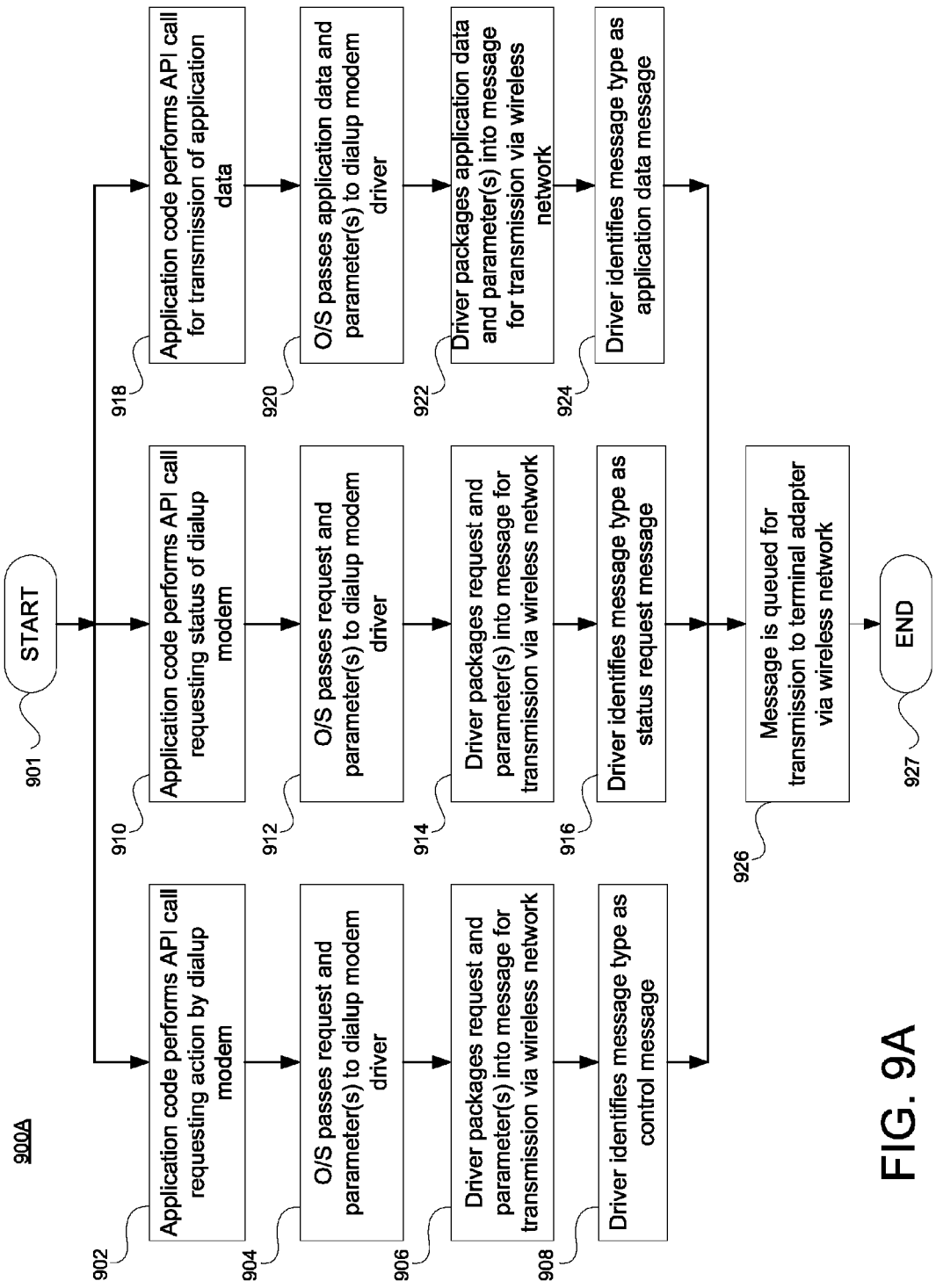
FIG. 9A shows a flowchart illustrating aspects of an exemplary method of operating a communication system such as, for example, the communication system of FIG. 6, that supports a wireless local area network (e.g., WiFi) interface to a dialup modem, in accordance with a representative embodiment of the present invention.

FIG. 9A shows a flowchart 900A illustrating aspects of an exemplary method of operating a communication system such as, for example, the communication system 600 of FIG. 6, that supports a wireless local area network (e.g., WiFi) interface to a dialup modem, in accordance with a representative embodiment of the present invention. The method of the flowchart 900 of FIG. 9A may be employed in situations in which application code such as, for example, a dialup manager or an Internet browser engages in interaction with a dialup modem on a PC (block 901). Such an interaction may involve the establishment of a dialup link, the checking of status of a dialup modem, or the sending of application data via the dialup modem, for example. In the leftmost column of the illustration of FIG. 9A, the application code may perform an application program interface (API) call to the operating system (O/S) of the personal computer (PC), requesting a particular action by the dialup modem (block 902). The action may comprise going off-hook and dialing a directory number of an Internet service provider, or establishing a modem-to-modem connection, for example. The O/S may pass the request and any parameter(s) involved to interface code comprising a dialup modem driver (block 904). The interface code may correspond to, for example, the interface code 667 of FIG. 6. In a representative embodiment of the present invention, the dialup modem driver may, for example, direct such a request over a wireless network instead of directly controlling a local dialup modem connected to the PC. The dialup modem driver may package the request and any parameter(s) involved into a message for transmission via the wireless network (block 906). The dialup modem driver may identify the message type as a control message (block 908). The message may then be queued for transmission to a terminal adapter such as, for example, the terminal adapter 671 of FIG. 6 (block 926)

At another time, the application code may desire to check the status of the dialup modem, and may perform an API call to the O/S of the PC, requesting status of the dialup modem (block 910). This may include, for example, whether all information has been sent, or whether dial tone or a carrier of a distant modem has been detected. The O/S may pass the status request and any parameter(s) involved to the dialup modem driver (block 912). In a representative embodiment of the present invention, the dialup modem driver may, for example, direct such a status request over a wireless network instead of directly accessing status information from a local dialup modem connected to the PC. The dialup modem driver may package the status request and any parameter(s) involved into a message for transmission via the wireless network (block 914). The dialup modem driver may identify the message type as a status request message (block 916). The message may then be queued for transmission to a terminal adapter such as, for example, the terminal adapter 671 of FIG. 6 (block 926).

At yet another time, the application code may desire to send application data via the communication link provided by the dialup modem, and may perform an API call to the O/S of the PC, for transmission of application data (block 918). The application data may comprise, for example, a query of a remote database, or information send by an Internet browser. The O/S may pass the application data and any parameter(s) involved to the dialup modem driver (block 920). In a representative embodiment of the present invention, the dialup modem driver may, for example, direct the application data and parameter(s) over a wireless network instead of directly transmitting the application data via a local dialup modem connected to the PC. The dialup modem driver may package the application data and any parameter(s) involved into a message for transmission via the wireless network (block 922), and may identify the message type as an application data message (block 924). The message may then be queued for transmission to a terminal adapter such as, for example, the terminal adapter 671 of FIG. 6 (block 926).

Figure 9B:
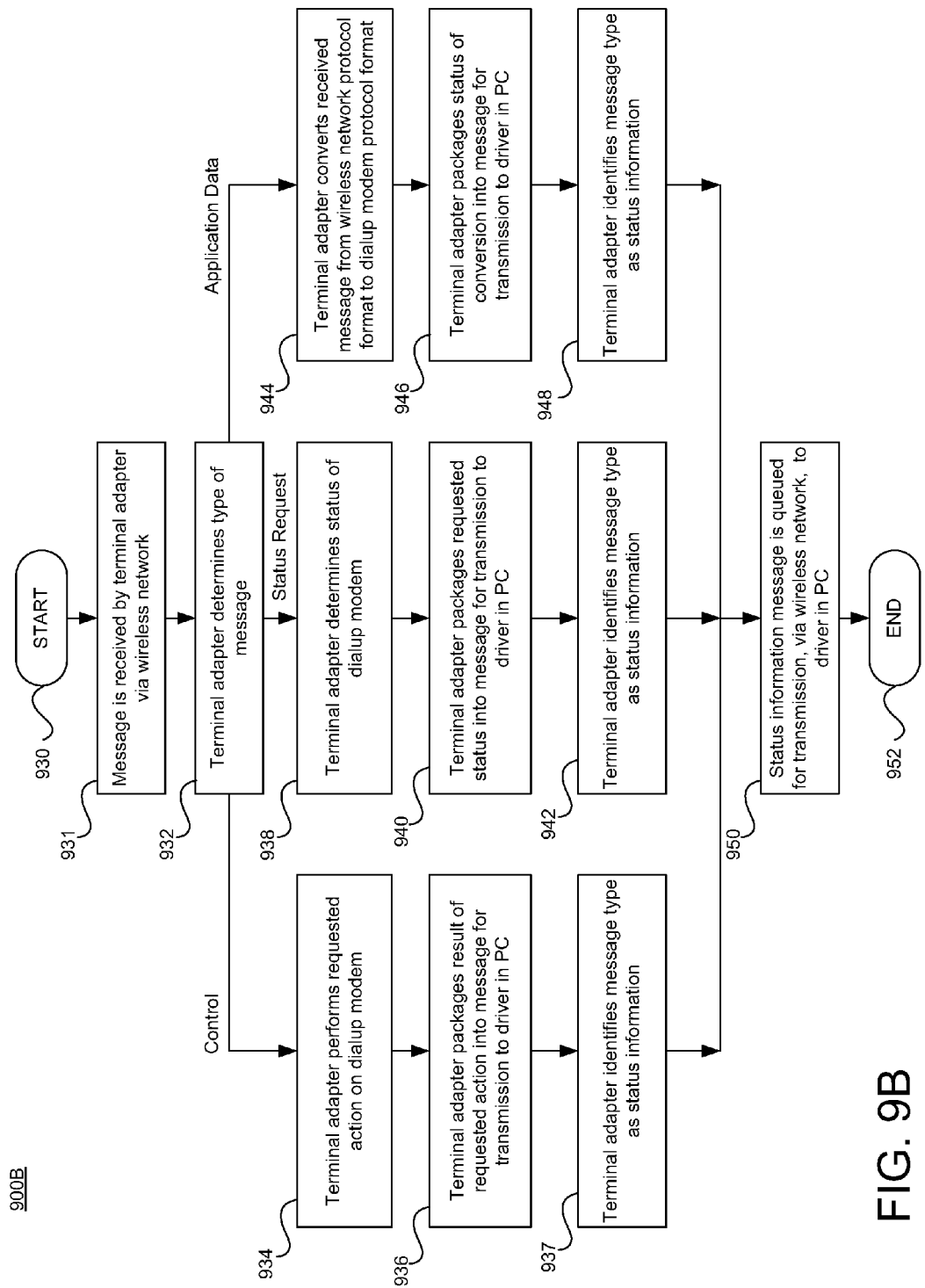
FIG. 9B shows a flowchart that illustrates additional aspects of an exemplary method of operating a communication system such as, for example, the communication system of FIG. 6, that supports a wireless local area network (e.g., WiFi) interface to a dialup modem, in accordance with a representative embodiment of the present invention.

FIG. 9B shows a flowchart 900B that illustrates additional aspects of an exemplary method of operating a communication system such as, for example, the communication system 600 of FIG. 6, that supports a wireless local area network (e.g., WiFi) interface to a dialup modem, in accordance with a representative embodiment of the present invention. The flowchart 900B of FIG. 9B illustrates processing by a terminal adapter such as, for example, the terminal adapter 671 of FIG. 6 of the messaging sent by a PC as discussed above with respect to FIG. 9A. The flowchart 900B begins following power-up of the terminal adapter (block 930). The terminal adapter may receive, via a wireless network, a message from a PC such as, for example, the PC 660 of FIG. 6 (block 931). The terminal adapter may determine the type of the received message such as, for example, a control message, a status request message, and an application data message (block 932). In the case of a control message, the terminal adapter may proceed in the leftmost path of FIG. 9B, and may perform the requested action on the dialup modem in the terminal adapter (block 934). This may include, for example, going off-hook and dialing a directory number of an Internet service provider, or establishing a modem to modem connection. After performing such an action, the terminal adapter may package a result of the requested action into messaging for transmission, via the wireless network, to the PC 660 (block 936). The terminal adapter may identify the message as a status information type message (block 937), and may then queue the message for transmission, via the wireless network, to the PC (block 950). The method of FIG. 9B then ends (block 952).

If the terminal adapter determines that the received message is a status request message (block 932), the terminal adapter may determine the status of the dialup modem of the terminal adapter (block 938). The terminal adapter (e.g., the terminal adapter 671) may then package the requested status information into a message for transmission to the PC via the wireless network (block 940). The message may be identified by the terminal adapter as being a status information type message (block 942), and may then be queued for transmission to the PC via the wireless network (block 950). The method of FIG. 9B then ends (block 952).

If the terminal adapter determines that the received message is an application data type message (block 932), the terminal adapter may convert the format of the message from that used for the protocol of the wireless network, to that used for the protocol of the dialup network (block 946). This may involve conversion from a packet protocol for use on an IEEE 802.11b wireless LAN to a point-to-point protocol (PPP) or other protocol suitable for use via a ANSI V.92 dialup modem connection, for example. The terminal adapter (e.g., the terminal adapter 671) may package status information about the processing and transmission of the application data, via the dialup modem link into a message for transmission to the PC via the wireless network (block 946), that may be identified as a status information type message (block 948). The status information message may be queued for transmission to the PC 660, for example, via the wireless network (block 950). The method of FIG. 9B then ends (block 952).

Figure 9C:
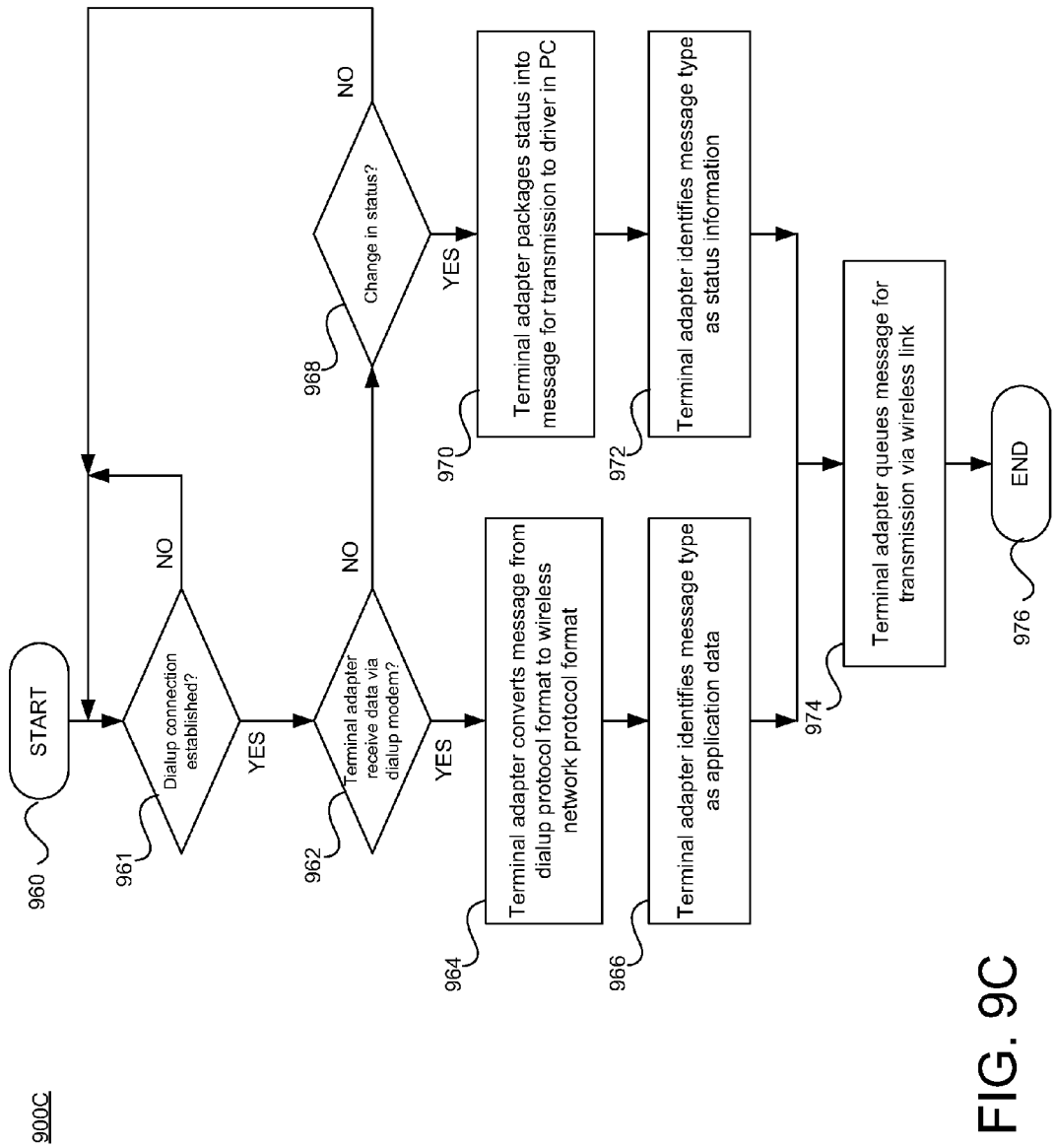
FIG. 9C shows a flowchart that illustrates further aspects of an exemplary method of operating a communication system such as, for example, the communication system of FIG. 6, that supports a wireless local area network (e.g., WiFi) interface to a dialup modem, in accordance with a representative embodiment of the present invention.

FIG. 9C shows a flowchart 900C that illustrates further aspects of an exemplary method of operating a communication system such as, for example, the communication system 600 of FIG. 6, that supports a wireless local area network (e.g., WiFi) interface to a dialup modem, in accordance with a representative embodiment of the present invention. The flowchart 900C of FIG. 9C illustrates processing by a terminal adapter such as, for example, the terminal adapter 671 of FIG. 6 of messages and events that are to be communicated to a PC such as, for example, the PC 660 of FIG. 6, discussed above. The flowchart 900C begins following power-up of the terminal adapter (block 960). The terminal adapter may determine whether a dialup connection is currently established (block 961). If a dialup connection is not currently established, the method may loop to check again. If a dialup connection does exist, the terminal adapter may determine whether data has been received via a dialup modem (block 962). If data has not been received, a check may be made whether a change in dialup modem or line status has occurred (block 968). If no change in dialup modem or line status has occurred, the method of FIG. 9C may loop back to continue checking. If, however, a change in dialup modem or line status has occurred, the terminal adapter may package status information into a message for transmission to the PC (e.g., the PC 660) (block 970). The terminal adapter may identify the message as status information (block 972), and may queue the message for transmission via the wireless network link (block 974). The method of FIG. 9C then ends (block 976).

If data has been receive via the dialup modem link (block 962), the terminal adapter may convert the received data from dialup protocol format to a format suitable for use on the wireless local area network linking the terminal adapter and the PC (block 964). The terminal adapter may then identify the message as an application data message (block 966), and may queue the message for transmission to the PC, via the wireless network (block 974). The method of FIG. 9C then ends (block 976).

Figure 9D:
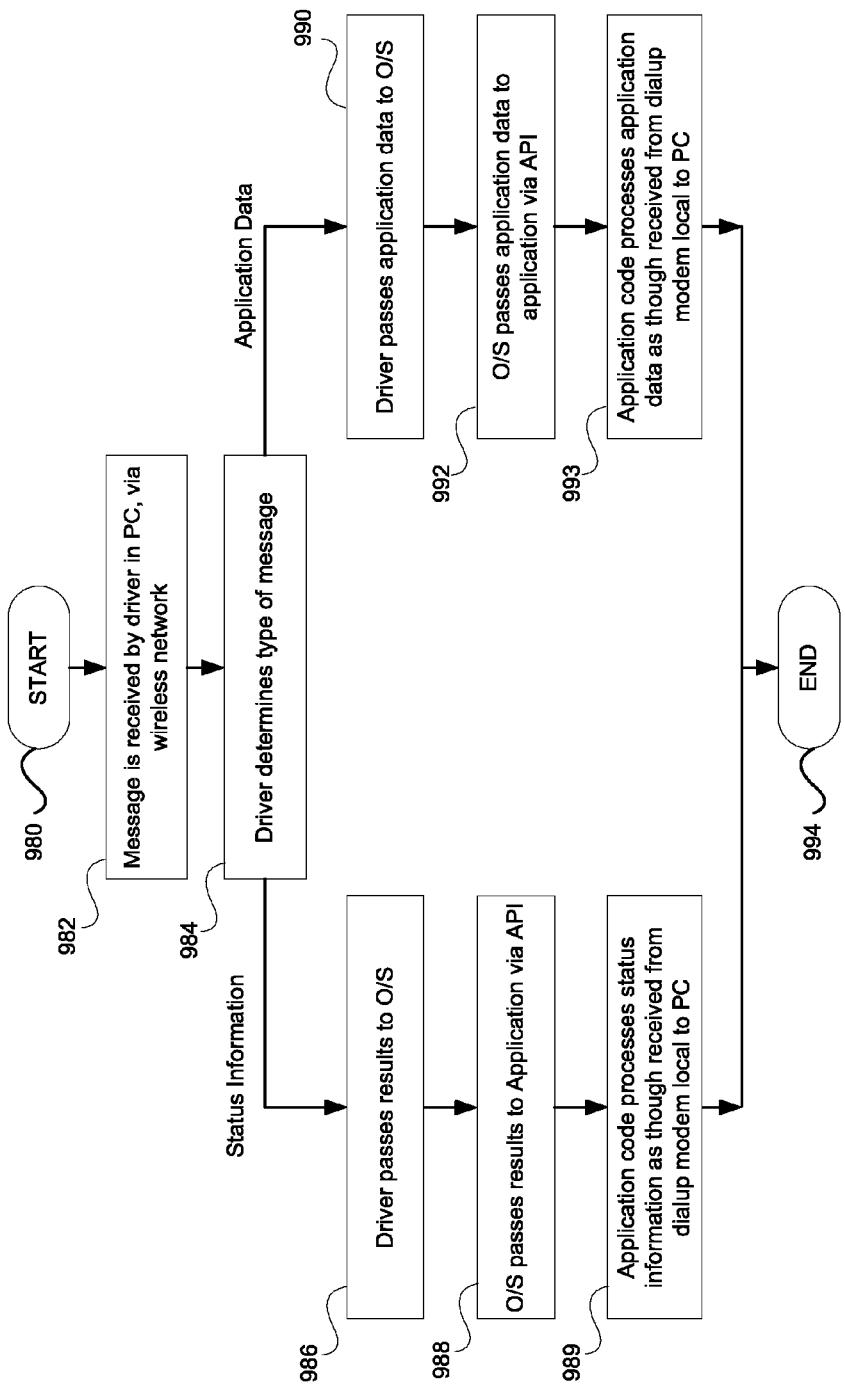
FIG. 9D shows a flowchart illustrating additional aspects of an exemplary method of operating a communication system such as, for example, the communication system of FIG. 6, that supports a wireless local area network (e.g., WiFi) interface to a dialup modem, in accordance with a representative embodiment of the present invention.

FIG. 9D shows a flowchart 900D illustrating additional aspects of an exemplary method of operating a communication system such as, for example, the communication system 600 of FIG. 6, that supports a wireless local area network (e.g., WiFi) interface to a dialup modem, in accordance with a representative embodiment of the present invention. The method of flowchart 900D in FIG. 9D may be employed in situations in which application code such as, for example, a dialup manager or an Internet browser engages in interaction with a dialup modem on a PC (block 980). In the discussion of FIG. 9A, above, the communication system is processing control, status, and application data communications destined for the dialup modem. In the following discussion, the communication system is processing status information and application data communications destined for a PC such as, for example, the PC 660 of FIG. 6. In the illustration of FIG. 9D, a PC (e.g., the PC 660) employing the method may receive a message from a terminal adapter (e.g., the terminal adapter 671), via a wireless network (block 982). Interface code (e.g., driver software) in the PC may determine the type of the received message (block 984). If the received message is determined to be a status information message, the interface code (e.g., driver software) may pass the status information to the operating system (O/S) (block 986), that may then provide the status information to application code (e.g., an Internet browser or dialup manager), via the application programming interface (API) used to request the status information (block 988). The application code may then process the received status information as though it was received from a dialup modem local to the PC (block 989). The method illustrated in FIG. 9D then ends (block 994).

If the interface code determines that the received message is application data (block 984), the interface code (e.g., driver software) may pass the application data to the O/S (block 990), that may then provide the application data to the application code that originated the API call (block 992). The application code may then process the received application data as though it was received from a dialup modem local to the PC (block 993). The method illustrated in FIG. 9D then ends (block 994).

Aspects of the present invention may be found in a terminal adapter device comprising at least one wireless interface for communicating via at least one of the following: a local area network and a personal area network, and a dialup modem for communicating via a conventional switched telephone network. A representative embodiment of the present invention may comprise at least one processor communicatively coupled to the at least one wireless interface and to the dialup modem, and machine-readable storage. The machine-readable storage may be communicatively coupled to the at least one processor, and may comprise first executable code for causing the at least one processor to selectively communicate user information between the at least one wireless interface and the dialup modem. The at least one wireless interface may communicate according to an Institute of Electrical and Electronics Engineers (IEEE) 802.11 standard, and may communicate according to an Institute of Electrical and Electronics Engineers (IEEE) 802.15.3a or compatible standard. The device may implement an Internet browser compatible user interface for dialing a directory number, and the user interface may be accessible via the at least one wireless interface.

In a representative embodiment of the present invention, a directory number for dialing via the dialup modem may be communicated via the at least one wireless interface using a hypertext transfer protocol (HTTP). The directory number may be communicated as part of a universal resource locator (URL). The dialup modem may be compatible with one of the International Telecommunication Union (ITU) V.90 and V.92 standards. The first executable code may communicate via the at least one wireless interface with second executable code in machine readable storage of a personal computer, and communication between the first and second executable code may enable application code on the personal computer to utilize the dialup modem as if the dialup modem were an operable component of the personal computer. The state of at least one out-of-band signal may be communicated between the first executable code and the second executable code via the at least one wireless interface. The at least one out-of-band signal may comprise one of the following: a clear to send signal, a request to send signal, a data terminal ready signal, a data set ready signal, a carrier detect signal, and a ring indicator signal. The at least one out-of-band signal may be used for controlling flow of the user information.

Additional aspects of the present invention may be seen in a method of operating a device supporting dialup access from a wireless local area network. Such a method may comprise wirelessly receiving a message, at a first location, via the wireless local area network, parsing dialing information from the message, at the first location, and establishing modem communication, at the first location via a wired network, using the dialing information. A representative embodiment of the present invention may also comprise converting user information between a packet protocol and a dialup modem protocol, at the first location, and wirelessly exchanging user information between the first location and a second location. The wireless local area network may comprise one of the following: an Institute of Electrical and Electronics Engineers (IEEE) 802.11 compatible network and an Institute of Electrical and Electronics Engineers (IEEE) 802.15.3a compatible network. The dialing information may comprise a dialable number in a conventional switched telephone network, and the wired network may comprise a conventional switch telephone network.

In a representative embodiment of the present invention, the dialup modem protocol may comprise one of the following: an Internet Engineering Task Force (IETF) RFC-1661 compatible point-to-point (PPP) protocol, an International Telecommunication Union (ITU) V.90 protocol, and an ITU V.92 protocol. A representative embodiment of the present invention may also comprise sending, via the wireless local area network, information representative of a web page user interface. The user interface information may be compatible with a conventional Internet web browser application. A representative embodiment in accordance with the present invention may comprise communicating at least one out-of-band signal between the dialup modem and the second location, and the at least one out-of-band signal may comprise one of the following: a clear to send signal, a request to send signal, a data terminal ready signal, a data set ready signal, a carrier detect signal, and a ring indicator signal. The at least one out-of-band signal may be used for controlling flow of the user information.

Still other aspects of the present invention may be observed in a machine-readable storage, having stored thereon a computer program having a plurality of code sections executable by a machine for causing the machine to perform the operations described above:

As can be seen from the illustrations of the figures and the description provided herein, a representative embodiment of the present invention provides wireless mobility to subscribers with dialup access to Internet service provider services, using conventional personal computing equipment having wireless local area and/or personal area networking capability. Although the example provided above has been simplified for reasons of clarity, additional features and functionality may be provided without departing from the spirit and scope of the present invention.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
    at least one processor that enables communicative coupling to at least one wireless interface for communicating via one or both of a local area network and/or a personal area network and to a modem for communicating via a wired communication network, the at least one processor operable to, at least:
    wirelessly receive a message;
    parse information for establishing a connection through the wired communication network from the message;
    establish a connection through said modem using the information for establishing a connection; and
    selectively communicate user information between the at least one wireless interface and the modem.

2. The system according to claim 1 wherein communication via the at least one wireless interface is according to or compatible with an Institute of Electrical and Electronics Engineers (IEEE) 802.11 standard published on or before Jun. 3, 2005.

3. The system according to claim 1 wherein communication via the at least one wireless interface is according to or compatible with an Institute of Electrical and Electronics Engineers (IEEE) 802.15.3a or compatible standard published on or before Jun. 3, 2005.

4. The system according to claim 1 wherein the system implements an Internet browser compatible user interface for entering a network address on the wired communication network, the user interface accessible via the at least one wireless interface.

5. The system according to claim 1 wherein a network address for transmission via the modem is communicated via the at least one wireless interface using a hypertext transfer protocol (HTTP).

6. The system according to claim 5 wherein the network address is communicated as part of a universal resource locator (URL).

7. The system according to claim 1 wherein first executable code of the system communicates via the at least one wireless interface with second executable code in machine readable storage of a personal computer, and wherein communication between the first and second executable code enables application code on the personal computer to utilize the modem as if the modem were an operable component of the personal computer.

8. The system according to claim 7 wherein the state of at least one signal that is not user information is communicated between the first executable code and the second executable code via the at least one wireless interface.

9. The system according to claim 8 wherein the at least one signal that is not user information comprises one or more of the following: a clear to send signal, a request to send signal, a data terminal ready signal, a data set ready signal, a carrier detect signal, and/or a signal to initiate an incoming connection.

10. The system according to claim 8 wherein the at least one signal that is not user information is used for controlling flow of the user information.

11. A computer-readable medium, having stored thereon a computer program having a plurality of code sections for operating a system supporting access to a wired communication network from a wireless network, the code sections executable by a processor for causing the processor to perform operations comprising:
    wirelessly receiving a message using one of a local area network and a personal area network;
    parsing, from the message, information for establishing a connection through the wired communication network;
    establishing a connection through a modem to the wired communication network using the information for establishing a connection; and
    selectively communicating user information between the wireless network and the wired network using the modem.

12. The computer-readable medium according to claim 11 wherein wireless communication is according to or compatible with an Institute of Electrical and Electronics Engineers (IEEE) 802.11 standard published on or before Jun. 3, 2005.

13. The computer-readable medium according to claim 11 wherein wireless communication is according to or compatible with an Institute of Electrical and Electronics Engineers (IEEE) 802.15.3a or compatible standard published on or before Jun. 3, 2005.

14. The computer-readable medium according to claim 11 wherein the system implements an Internet browser compatible user interface for entering a network address on the wired communication network, the user interface accessible via the wireless network.

15. The computer-readable medium according to claim 11 wherein a network address for transmission via the modem is communicated over the wireless network using a hypertext transfer protocol (HTTP).

16. The computer-readable medium according to claim 15 wherein the network address is communicated as part of a universal resource locator (URL).

17. The computer-readable medium according to claim 11 comprising first executable code that communicates via the wireless network with second executable code in computer-readable medium of a personal computer, and wherein communication between the first and second executable code enables application code on the personal computer to utilize the modem as if the modem were an operable component of the personal computer.

18. The computer-readable medium according to claim 17 wherein the state of at least one signal that is not user information is communicated between the first executable code and the second executable code via the wireless network.

19. The computer-readable medium according to claim 18 wherein the at least one signal that is not user information comprises one or more of the following: a clear to send signal, a request to send signal, a data terminal ready signal, a data set ready signal, a carrier detect signal, and/or a signal to initiate an incoming connection.

20. The computer-readable medium according to claim 18 wherein the at least one signal that is not user information is used for controlling flow of the user information.

21. A method for operating a system supporting access to a wired communication network from a wireless network, the method comprising:
wirelessly receiving a message using one of a local area network and a personal area network;
parsing, from the message, information for establishing a connection through the wired communication network;
establishing a connection through a modem to the wired communication network using the information for establishing a connection; and
selectively communicating user information between the wireless network and the wired network using the modem.

22. The method according to claim 21 wherein wireless communication is according to or compatible with an Institute of Electrical and Electronics Engineers (IEEE) 802.11 standard published on or before Jun. 3, 2005.

23. The method according to claim 21 wherein wireless communication is according to or compatible with an Institute of Electrical and Electronics Engineers (IEEE) 802.15.3a or compatible standard published on or before Jun. 3, 2005.

24. The method according to claim 21 wherein the system implements an Internet browser compatible user interface for entering a network address on the wired communication network, the user interface accessible via the wireless network.

25. The method according to claim 21 wherein a network address for transmission via the modem is communicated over the wireless network using a hypertext transfer protocol (HTTP).

26. The method according to claim 25 wherein the network address is communicated as part of a universal resource locator (URL).

27. The method according to claim 21 comprising first executable code that communicates via the wireless network with second executable code in computer-readable medium of a personal computer, and wherein communication between the first and second executable code enables application code on the personal computer to utilize the modem as if the modem were an operable component of the personal computer.

28. The method according to claim 27 wherein the state of at least one signal that is not user information is communicated between the first executable code and the second executable code via the wireless network.

29. The method according to claim 28 wherein the at least one signal that is not user information comprises one or more of the following: a clear to send signal, a request to send signal, a data terminal ready signal, a data set ready signal, a carrier detect signal, and/or a signal to initiate an incoming connection.

30. The method according to claim 28 wherein the at least one signal that is not user information is used for controlling flow of the user information.

* * * * *